Dec. 18, 1934.   F. FISCHER   1,984,471
LENTICULATED FILM
Filed July 16, 1932

Fritz Fischer
INVENTOR
BY Gifford, ...Burgess,
ATTORNEYS.

Patented Dec. 18, 1934

1,984,471

UNITED STATES PATENT OFFICE 1,984,471

LENTICULATED FILM

Fritz Fischer, Berlin-Charlottenburg, Germany, assignor to Siemens & Halske, Aktiengesellschaft, Siemensstadt, near Berlin, Germany, a corporation of Germany Application July 16, 1932, Serial No. 622,887
In Germany July 18, 1931

9 Claims. (Cl. 95—2)

The object of the present invention is an improved colour reproduction in the projection of images on lenticulated films, and in addition a better and more uniform utilization of the emulsion on the film slip both for projection and copying purposes. Another advantage of the invention is that materially better copies can be made. It is also possible to obtain brighter images on the projection screen than with the ordinary lenticulated films. Further advantages are indicated in the following description.

According to the invention the films are equipped on the side containing the emulsion with optical elements effecting a deflection of light. For this end use can be made either of small lenses or of a diffraction grid. The grid dissipates the light so that each point of the picture seems to radiate at a greater angle. Consequently the amount of the effective light will be almost the same for all portions of the image. On using spherically shaped lenticulations or the like, the grid is a dot-grid, whereas on using cylindrical lenses, it takes the form of a dash-grid, whose bars must as much as possible run in parallel with the axes of the cylindrical lenses. The effect of small lenses on the side of the emulsion consists in that they direct the light, like small condensers, to the lenticulations placed on the other side.

The figures show the cross-section of different devices for carrying the invention into effect.

The same designations refer to corresponding parts in the figures.

Figure 1:
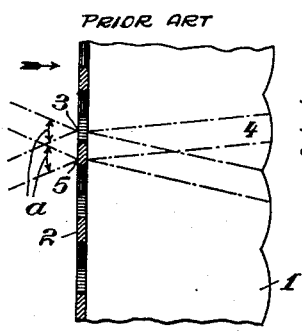
Fig. 1 shows an ordinary lenticulated film, with the inherent drawbacks.

In Fig. 1, the light incides from the left on the emulsion 2, in the direction of the arrow. The angle at which the source of light is viewed from the emulsion is assumed to be $a$. The light beam passing through the point 3 is then refracted in such a manner that the whole of the light passes through the lens 4 placed in front of point 3. But of the light beam illuminating the point 5 situated laterally, only a portion reaches lens 4, whereas the portion reaching the neighbouring lens does not enter the objective and is lost for projection purposes. This drawback is noticeable in the same manner if the images are illuminated for copying purposes, more particularly if contact copies are involved.

Figure 2:
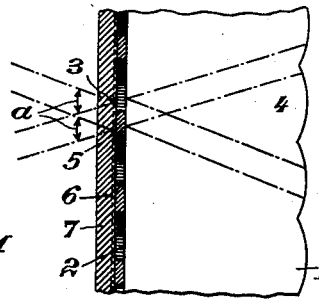
Fig. 2 shows a lenticulated film which is illuminated from the emulsion side and fitted with a diffraction grid in contact with the layer.

If, however, as shown in Fig. 2, the emulsion containing the image is equipped with a diffraction grid 6, which may be produced for instance on a thin glass plate 7 by an engraving process, and if the light source is viewed at the same angle $a$, the angle at which the light leaves the emulsion, due to the light dissipation at the grid, will be sufficiently enlarged to enable also the light beam passing through point 5 to illuminate the lens 4 almost entirely. Hence from the lateral point 5, almost as much light passes through the lens lying in front of it, than from point 3. The total amount of light used to project a central point is thereby slightly reduced, but this drawback may be more easily eliminated by increasing the intensity of the light-source than the one that the border zones are projected with insufficient light, as it is the case if the light cones which have their apices in the film, are too small. The diffraction grid is preferably arranged so as to lie in the threading gap. It can however also be directly photographed on the light-reactive emulsion.

In order to make the angle at which the light is dissipated sufficiently large, the grid constant must be made sufficiently small. The grid is preferably chosen so as to cause at least three grid bars to be assigned to a zone situated behind a lens. A spectral light decomposition at the grid is therefore in general not objectionable, since only the first maximum of the diffraction image is used. In case coloured shades should be produced by dissipation at the borders of the light beam, in the copying process these can be made unobjectionable by the use of homogeneous light. For enlarging the angle of dissipation use should also be made, for the copy of homogeneous, and with the limits possible of long-waye light.

Figure 3:
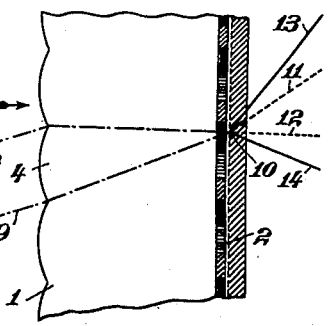
Fig. 3 represents the same film equally equipped with a diffraction grid the illumination being however achieved from the side of the emulsion medium.

The performance of the diffraction grid for the case when the source of light is arranged on the side of the celluloid of the film, may be seen in Fig. 3. Of the light beam striking the film in the direction of the arrow, only the parallel light beams 8, 9 have been drawn. The rays of this brush are refracted by the lens 4 in such a manner that they pass the point 10 situated behind one of the edges of lens 4. If there would be no diffraction grid, the light would leave the point 10 so as to fall between the rays indicated by the dotted lines 11 and 12. By the use of the diffraction grid this brush is enlarged so as to make the border rays to be 12 and 14. As is seen, the illuminated angle of the light-beams projecting the different picture elements, which reaches the objective is also in this device, of almost equal magnitude for all picture portions, so as to enable the border portions to be projected just as brightly as are the intermediate zones.

Figure 4:
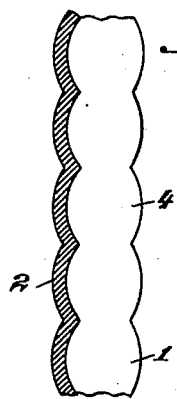
Fig. 4 shows a film which is lenticulated on both sides.

Another constructional example is shown in Fig. 4. The film medium 1 which may be of celluloid is lenticulated on both sides and the light-reactive emulsion is equally lenticulated at its surface. It is advantageous to arrange the lenticulations on both sides of the film so that they are exactly opposite to one another. For the case most frequently occurring in practice i. e. that the refraction index of the emulsion is almost equal to that of the celluloid, the two sides of the film should be symmetrical with respect to the geometric shape of the lenticular elements.

Figure 5:
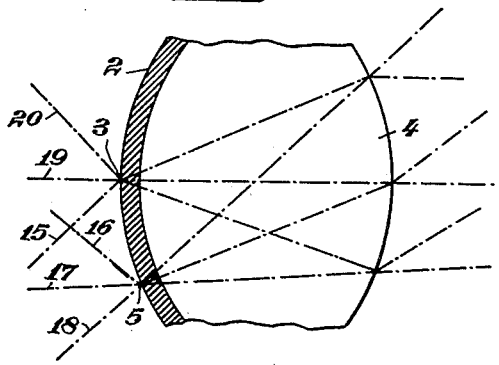
Fig. 5 shows the performance of the film shown in Fig. 4.

The effect of such a film when illuminated from the emulsion side is shown in Fig. 5, where a single lens has been drawn on an enlarged scale. In the emulsion 2 there is the image which is illuminated by light of which rays 15 and 20 are indicated.

The central ray 18 passes unrefracted through the film and the cone of light defined by 15, 19 and 20 retains its direction, while its angle is slightly reduced. Conditions are different for ray 17 parallel to ray 19 and forming the main ray of the beam 16, 17, 18. Ray 17, which, on striking a film goffered on one side only, would pass unrefracted through the emulsion 2, is refracted so as to enable the whole of the light beam, determined by the rays 16, 17 and 18 to pass through the lens before it. Thus in this case, also the light striking a portion of the film which lies almost behind an edge of a lens is fully utilized.

The film goffered on both sides acts in much the same manner if it is illuminated from the side not carrying an emulsion. The lenticular elements turned towards the source of light may be regarded as small condensers.

Figure 6:
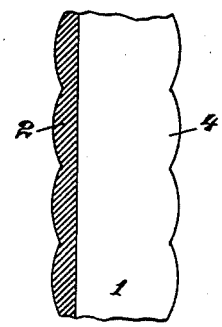
Figs. 6 and 7 show two constructional examples which slightly differ from the film slip shown in Fig. 4.
Figure 7:
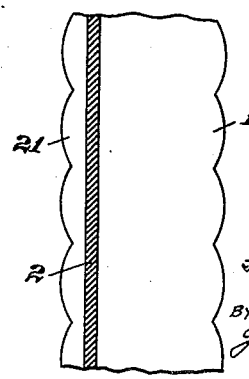

Since, in general, the refraction index of the light-reactive emulsion is almost equal to that of the emulsion medium, it is sufficient to manufacture a film slip as indicated in Fig. 6. In this case, the celluloid forming the carrier is only goffered on one side, whereas the smooth rear side carries the light-reactive emulsion 2 whose surface is lenticulated.

The lenticular elements are produced by passing the film slip between two goffering cylinders of analogous design. Use can also be made of a photographic process for obtaining two lenticulations whose elements are placed exactly opposite to one another. The film is, for instance, made reactive to rays not acting on the emulsion and the constitution of the portions stroken by these rays is sufficiently altered to enable these portions to be removed.

To produce a film goffered on both sides, use can also be made of the effect obtained if a gelatine layer is acted on by pressure in such a manner that it can be hardened by means of a suitable subsequent treatment according to the pressure exerted on it. The hardened portions can then be eliminated. Thus if a film carrying an emulsion is goffered by the pressure exerted by a normal engraving roller, the portions of the emulsion which lie behind the edges of the lens will be exposed to the greatest pressure, so that, at these points, the subsequent treatment will cause a considerable amount of the emulsion to be hardened and removed.

Finally a film slip can also be obtained, according to the invention by providing the smooth light-reactive emulsion 2 placed on the goffered medium 1, with a thin lenticulated layer 21. The occurence of watered effects (moirés) permits one optically to control if the lenticulations are exactly opposite to one another. The curvature of the lenticular elements on the layer 21 must be dimensioned according to the refraction index and the thickness of the layers. The layer 21 should preferably be manufactured of material such as gelatine which is permeable to the solutions used for developing, fixing and reversal bath solutions.

I claim:

1. A film comprising a base having a multiplicity of lenticulations on one side thereof and an emulsion adjacent the other side thereof, and a multiplicity of light-deflecting elements disposed closely adjacent and in fixed relation to said emulsion and in the path of light passing therethrough.

2. A film comprising a base having a mutiplicity of lenticulations on one side thereof and an emulsion adjacent the other side thereof, and a light-diffracting grid disposed closely adjacent and in fixed relation to said emulsion and in the path of light passing therethrough.

3. A film comprising a base having a multiplicity of lenticulations on one side thereof and an emulsion adjacent the other side thereof, and a multiplicity of light-deflecting elements disposed closely adjacent and in fixed relation to said emulsion and in the path of light passing therethrough and embodied in said film.

4. A film comprising a base having a multiplicity of lenticulations on one side thereof and an emulsion adjacent the other side thereof, and a light-diffracting grid disposed closely adjacent and in fixed relation to said emulsion and in the path of light passing therethrough and embodied in said film.

5. A film comprising a base having a multiplicity of lenticulations on one side thereof and an emulsion adjacent the other side thereof, and a light-diffracting grid disposed closely adjacent and in fixed relation to said emulsion, and in the path of light passing therethrough, said grid being of such degree of fineness that three of the bars thereof are disposed substantially behind one of said lenticulations.

6. A film comprising a base having an emulsion thereon, and a multiplicity of lenticulations on opposite sides of said film.

7. A film comprising a base having an emulsion thereon, and a multiplicity of lenticulations on opposite sides of said film, with the lenticulations on one side of the film substantially opposite to those on the other side thereof.

8. A film comprising an emulsion layer interposed between two layers of gelatine or the like, and a multiplicity of lenticulations on the opposite outside surfaces of said gelatine layers.

9. A film comprising an emulsion layer interposed between two layers of gelatine or the like, and a multiplicity of lenticulations on the opposite outside surfaces of said gelatine layers, one of said gelatine layers being thicker than the other.

FRITZ FISCHER.